US012663364B2

(12) United States Patent
Lerner et al.

(10) Patent No.: US 12,663,364 B2
(45) Date of Patent: Jun. 23, 2026

(54) WATER TURBIDITY EVALUATION USING IMAGE SENSOR

(71) Applicant: Maytronics Ltd., Kibbutz Yizrael (IL)

(72) Inventors: Nachum Lerner, Akko (IL); Gilad Goldenberg, Kfar-Saba (IL)

(73) Assignee: Maytronics Ltd., Kibbutz Yizrael (IL)

( * ) Notice: Subject to any disclaimer, the term of this patent is extended or adjusted under 35 U.S.C. 154(b) by 300 days.

(21) Appl. No.: 18/220,918

(22) Filed: Jul. 12, 2023

(65) Prior Publication Data

US 2024/0019359 A1     Jan. 18, 2024

(30) Foreign Application Priority Data

Jul. 12, 2022     (IL) .......................................... 294718

(51) Int. Cl.
*G01N 21/25*         (2006.01)
*G01N 21/84*         (2006.01)

(52) U.S. Cl.
CPC ............. *G01N 21/25* (2013.01); *G01N 21/84* (2013.01)

(58) Field of Classification Search
CPC ...... G01N 21/25; G01N 21/84; G01N 21/534;
G01N 21/94; G01N 21/53; G01N 21/59;
G01N 15/06; G01N 21/49; G01N 33/18;
G01N 2021/0118; G01N 2201/0218;
G01N 1/00; G01N 1/24
See application file for complete search history.

(56) References Cited

U.S. PATENT DOCUMENTS

| | | | |
|---|---|---|---|
| 10,725,438 B1 | 7/2020 | Marsousi et al. | |
| 11,286,177 B2 | 3/2022 | Yisnack et al. | |
| 2015/0300938 A1* | 10/2015 | Debreczeny | ........... G01N 21/51 |
| | | | 356/338 |
| 2017/0184399 A1* | 6/2017 | Thayer | .................... G01S 7/499 |
| 2017/0248568 A1* | 8/2017 | Yizhack | ............. G01N 21/3577 |
| 2018/0246035 A1* | 8/2018 | Hasegawa | .............. G01N 33/18 |

(Continued)

FOREIGN PATENT DOCUMENTS

| | | |
|---|---|---|
| CN | 102565062 | 7/2012 |
| CN | 110274893 | 9/2019 |

(Continued)

OTHER PUBLICATIONS

Zhou et al "Liquid Turbidity Test Method Based On Image Grey Level Detection", Apr. 29, 2015, CN 102565062 B (Year: 2015).*

(Continued)

*Primary Examiner* — Sang H Nguyen

(57)     ABSTRACT

Disclosed herein are systems and methods for estimating water turbidity using image data, comprising analyzing a plurality of images of one or more objects submerged in water captured under water from a plurality of distances, calculating a luma value for each of a plurality of pixels along one or more gradient lines across the object(s) in each of the plurality of images, calculating, for each image, a respective maximal intensity change between a lowest luma value and a highest luma value of the pixels along the gradient line(s) in the respective image, evaluating a turbidity of the water based on mapping of the respective maximal intensity change to each of the plurality of distances, and initiating one or more actions in case the turbidity exceeds a certain threshold.

15 Claims, 6 Drawing Sheets

100

102 — RECEIVE A PLURALITY OF IMAGES DEPICTING AN OBJECT SUBMERGED IN WATER FROM A PLURALITY OF DISTANCES

104 — IDENTIFY THE OBJECT IN EACH OF THE IMAGES

106 — DETERMINE THE DISTANCE TO THE OBJECT IN EACH IMAGE

108 — CALCULATE A LUMA VALUE OF EACH PIXEL ALONG A GRADIENT LINE ACROSS THE OBJECT IN EACH IMAGE

110 — FOR EACH IMAGE CALCULATE A RESPECTIVE MAXIMAL INTENSITY CHANGE BETWEEN EXTREME LUMA VALUES OF PIXELS ALONG THE GRADIENT LINE

112 — EVALUATE TURBIDITY OF THE WATER BASED ON THE MAPPING OF THE MAXIMAL INTENSITY CHANGES WITH RESPECT TO THE PLURALITY OF DISTANCES

114 — INITIATE ONE OR MORE ACTIONS IN CASE THE EVALUATED TURBIDITY EXCEEDS A CERTAIN THRESHOLD

(56) References Cited

U.S. PATENT DOCUMENTS

| 2019/0270655 A1* | 9/2019 | Jorden | C02F 1/56 |
| 2021/0033589 A1* | 2/2021 | Tufillaro | G01J 3/0289 |

FOREIGN PATENT DOCUMENTS

| CN | 110672524 | 1/2020 |
| CN | 113155784 | 7/2021 |
| EP | 3521532 | 8/2019 |
| JP | H07-280792 | 10/1995 |
| WO | WO 2017/175261 | 10/2017 |

OTHER PUBLICATIONS

Office Action and Search Report Dated Feb. 7, 2023 From the Israel Patent Office Re. Application No. 294718. (6 Pages).

Supplementary European Search Report and the European Search Opinion Dated Nov. 21, 2023 From the European Patent Office Re. Application No. 23185061.1. (12 Pages).

Golanov et al. "Use of Contrast of Digital Photo Images fot the Determination of the Turbidity of Liquids", Journal of Analytical chemistry, 73(7): 667-673, 2018.

* cited by examiner

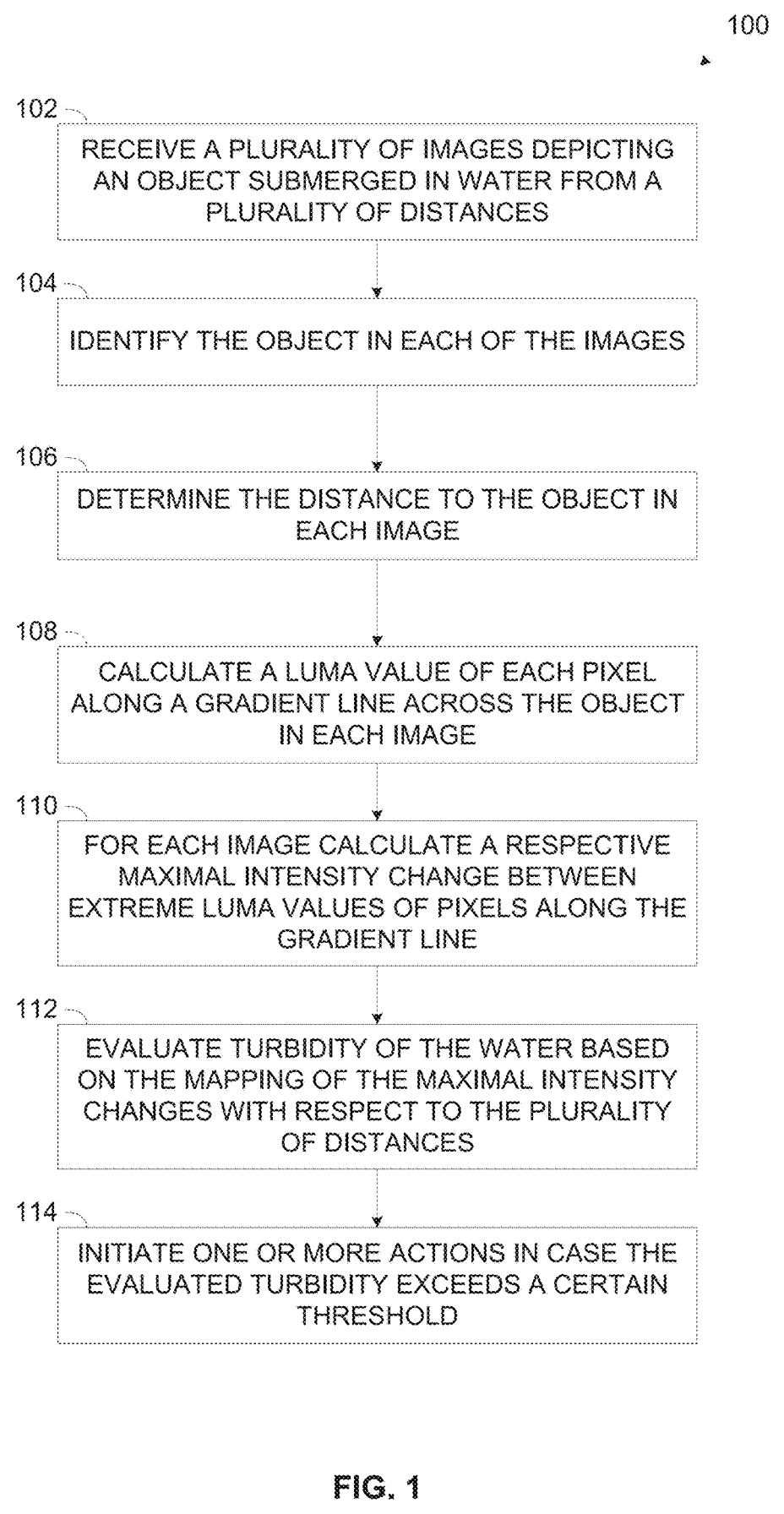

100

102

RECEIVE A PLURALITY OF IMAGES DEPICTING AN OBJECT SUBMERGED IN WATER FROM A PLURALITY OF DISTANCES

104

IDENTIFY THE OBJECT IN EACH OF THE IMAGES

106

DETERMINE THE DISTANCE TO THE OBJECT IN EACH IMAGE

108

CALCULATE A LUMA VALUE OF EACH PIXEL ALONG A GRADIENT LINE ACROSS THE OBJECT IN EACH IMAGE

110

FOR EACH IMAGE CALCULATE A RESPECTIVE MAXIMAL INTENSITY CHANGE BETWEEN EXTREME LUMA VALUES OF PIXELS ALONG THE GRADIENT LINE

112

EVALUATE TURBIDITY OF THE WATER BASED ON THE MAPPING OF THE MAXIMAL INTENSITY CHANGES WITH RESPECT TO THE PLURALITY OF DISTANCES

114

INITIATE ONE OR MORE ACTIONS IN CASE THE EVALUATED TURBIDITY EXCEEDS A CERTAIN THRESHOLD

FIG. 1

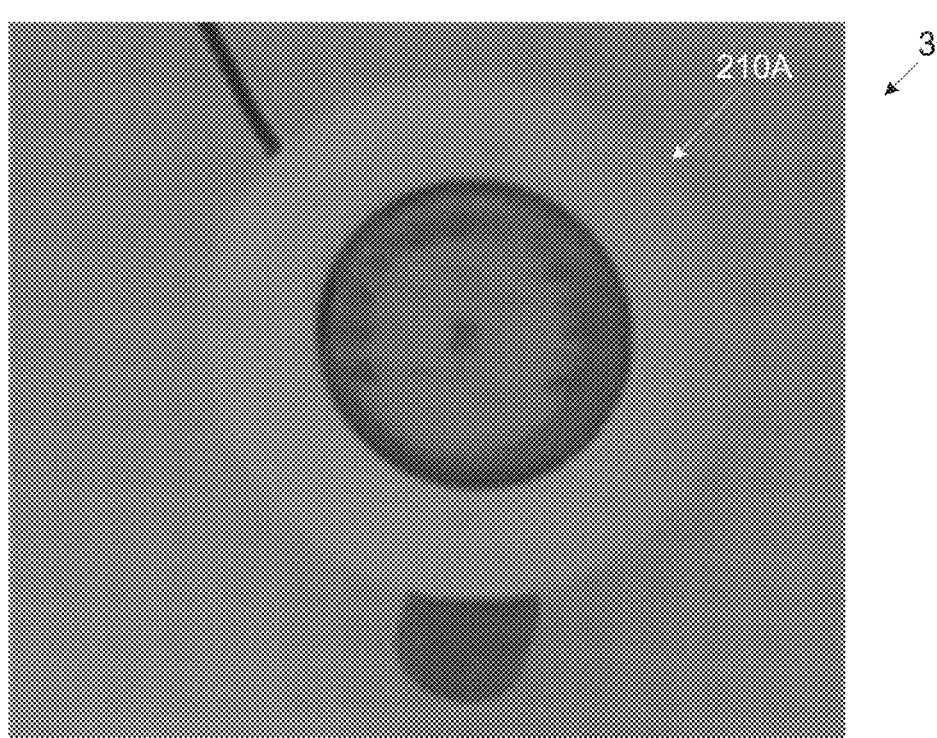
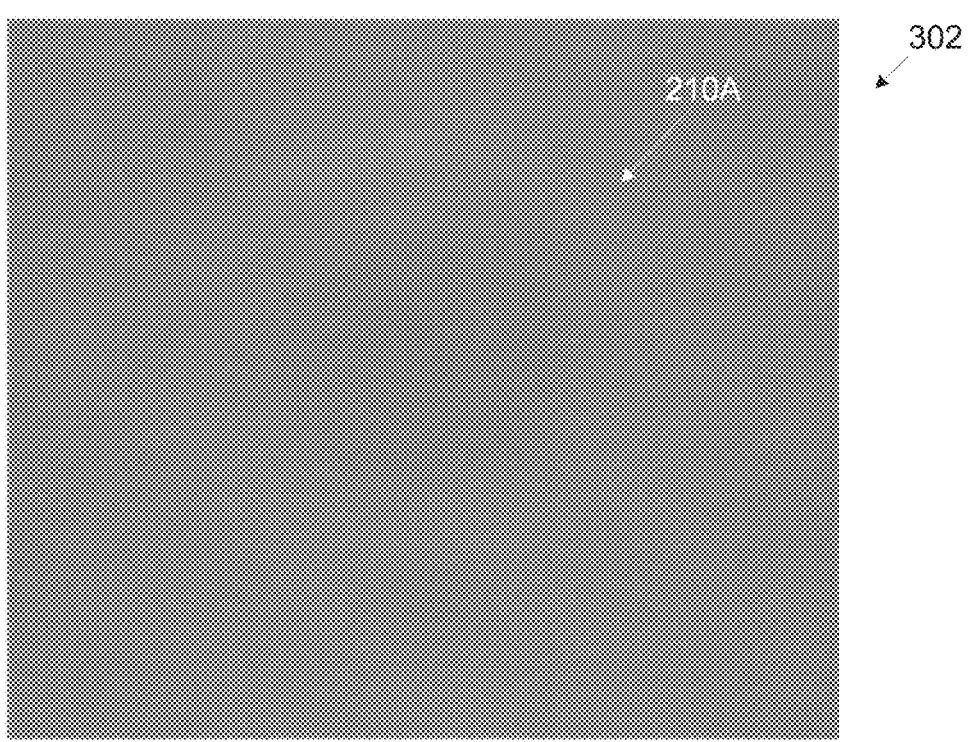
FIG. 3

600

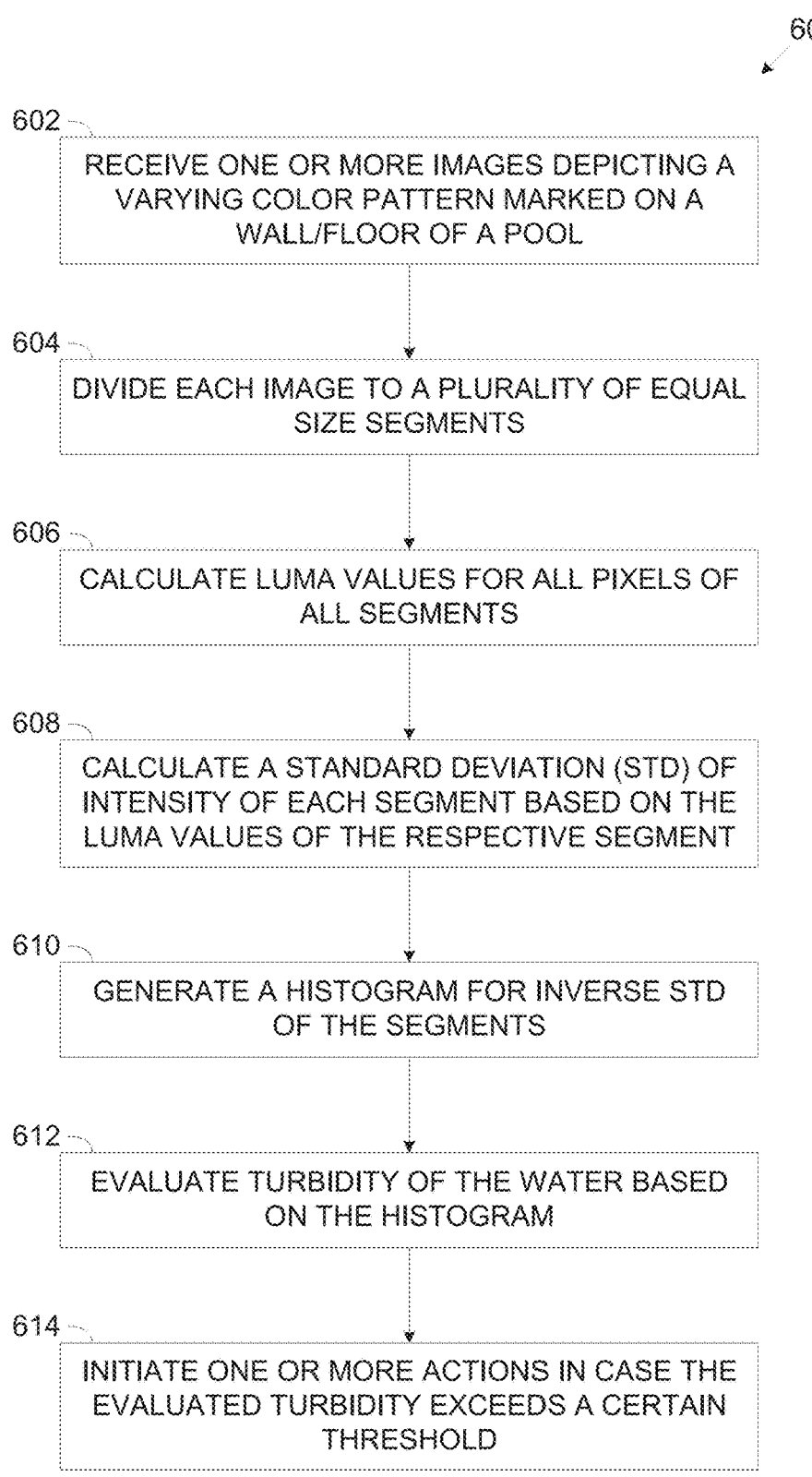

602

RECEIVE ONE OR MORE IMAGES DEPICTING A VARYING COLOR PATTERN MARKED ON A WALL/FLOOR OF A POOL

604

DIVIDE EACH IMAGE TO A PLURALITY OF EQUAL SIZE SEGMENTS

606

CALCULATE LUMA VALUES FOR ALL PIXELS OF ALL SEGMENTS

608

CALCULATE A STANDARD DEVIATION (STD) OF INTENSITY OF EACH SEGMENT BASED ON THE LUMA VALUES OF THE RESPECTIVE SEGMENT

610

GENERATE A HISTOGRAM FOR INVERSE STD OF THE SEGMENTS

612

EVALUATE TURBIDITY OF THE WATER BASED ON THE HISTOGRAM

614

INITIATE ONE OR MORE ACTIONS IN CASE THE EVALUATED TURBIDITY EXCEEDS A CERTAIN THRESHOLD

FIG. 6

WATER TURBIDITY EVALUATION USING IMAGE SENSOR

RELATED APPLICATION

This application claims the benefit of priority of Israel Patent Application No. 294718 filed on Jul. 12, 2022, the contents of which are incorporated by reference as if fully set forth herein in their entirety.

FIELD AND BACKGROUND OF THE INVENTION

The present invention, in some embodiments thereof, relates to evaluating turbidity of water in water bodies, and, more specifically, but not exclusively, to evaluating (estimating) turbidity of water in water bodies based on visual analysis of images captured by image sensors.

Ensuring high water quality, cleanliness and purity in artificial water bodies such as, for example, swimming pools, reservoirs, fountains, and/or the like may be highly desired and typically essential primarily for safety, health and/or hygiene related concerns.

However, water clarity may also significantly affect user experience of people using a swimming pool. First, underwater visibility may be significantly degraded when the water is not very clean. Moreover, foul water may cause the users to become highly concerned about hygiene conditions of the pool and may deter them from using it. Furthermore, in case of extreme water turbidity underwater visibility may be extremely low which may lead to safety risks for people using a swimming pool since people in distress in the pool, for example, drowning, experiencing a seizure, having a heart attack and/or the like may not be seen.

Turbidity of the water may constitute a major indicator of water quality and/or chemical balance since it is an indication of the amount of particles accumulated in the water and may be thus used to quantify the degree of cloudiness and/or clarity of the water. These small suspended particles of soil, algae or other materials in the microscopic size range to about one millimeter are often invisible to the naked eye and can be introduced from a variety of sources including air pollution, dirt, pollen, bathers, source water, algae, microbial organisms to name just a few.

Low turbidity of the water may be therefore highly indicative of clean and/or chemically balanced water, and in contrast, high turbidity may indicate of foul and/or chemically unbalanced water.

SUMMARY OF THE INVENTION

According to a first aspect of the present invention there is provided a method of estimating water turbidity using image data, comprising using one or more processors for:

Analyzing a plurality of images captured under water by one or more imaging sensors to identify one or more objects submerged in the water and distinguishable from their background. Each of the plurality of images is captured from a respective one of a plurality of distances between the one or more imaging sensors and the one or more objects.

Calculating a luma value for each of a plurality of pixels along one or more gradient lines across the one or more objects in each of the plurality of images.

Calculating, for each image, a respective maximal intensity change between a lowest luma value and a highest luma value of the pixels along the one or more gradient lines in the respective image.

Evaluating a turbidity of the water based on mapping of the respective maximal intensity change to each of the plurality of distances.

Initiating one or more actions in case the turbidity exceeds a certain threshold.

According to a second aspect of the present invention there is provided a system for evaluating water turbidity using image data, comprising one or more processors configured to execute a code. The code comprising:

Code instructions to analyze a plurality of images captured under water by one or more imaging sensors to identify one or more objects submerged in the water and distinguishable from its background. Each of the plurality of images is captured from a respective one of a plurality of distances between the one or more imaging sensors and the one or more objects.

Code instructions to calculate a luma value for each of a plurality of pixels along one or more gradient lines across the one or more objects in each of the plurality of images.

Code instructions to calculate, for each image, a respective maximal intensity change between a lowest luma value and a highest luma value of the pixels along the one or more gradient lines in the respective image.

Code instructions to evaluate a turbidity of the water based on mapping of the respective maximal intensity change to each of the plurality of distances.

Code instructions to initiate one or more actions in case the turbidity exceeds a certain threshold.

According to a third aspect of the present invention there is provided a method of evaluating water turbidity using image data, comprising using one or more processors for:

Receiving one or more images captured under water in a pool by one or more imaging sensors. The one or more images depict one or more varying color patterns of at least part of a circumferential wall and/or floor of the pool.

Dividing each of the one or more images to a plurality of segments of equal size.

Calculating a luma value for each of a plurality of pixels of each of the plurality of segments.

Calculating a standard deviation of intensity of each of the plurality of segments based on the luma values of the plurality of pixels of the respective segment.

Generating a histogram for inverse values of the intensity standard deviation of the plurality of segments.

Evaluating a turbidity of the water based on distribution of the histogram.

Initiating one or more actions in case the turbidity exceeds a certain threshold.

According to a fourth aspect of the present invention there is provided a system for evaluating water turbidity using image data, comprising one or more processors configured to execute a code. The code comprising:

Code instructions to receive one or more images captured under water in a pool by one or more imaging sensors. The one or more images depict one or more varying color patterns of at least part of a circumferential wall and/or floor of the pool.

Code instructions to divide the one or more images to a plurality of segments of equal size.

Code instructions to calculate a luma value for each of a plurality of pixels of each of the plurality of segments.

Code instructions to calculate a standard deviation of intensity of each of the plurality of segments based on the luma values of the plurality of pixels of the respective segment.

Code instructions to generate a histogram for inverse values of the intensity standard deviation of the plurality of segments.

Code instructions to evaluate a turbidity of the water based on distribution of the histogram.

Code instructions to initiate one or more actions in case the turbidity exceeds a certain threshold.

In a further implementation form of the first, second, third and/or fourth aspects, the water is swimming pool water.

In a further implementation form of the first, second, third and/or fourth aspects, the one or more actions are members of a group consisting of: transmitting one or more alert message, and/or inducing operation of water cleaning equipment in case the turbidity exceeds a predefined threshold.

In a further implementation form of the first and/or second aspects, turbidity of the water is evaluated based on one or more fitting functions adapted to approximate distribution of the maximal intensity changes mapped with respect to the distances from the one or more objects.

In a further implementation form of the first and/or second aspects, the one or more fitting functions are formulated by:

$$y = a \cdot e^{-bx}$$

where y is the respective maximal intensity change calculated for each of the plurality of images which correspond thus corresponding to one of the plurality of distances x, a is a largest maximal intensity change identified in the one or more gradient lines in all of the images, and b is the estimated turbidity.

In a further implementation form of the first and/or second aspects, the turbidity of the water is evaluated using one or more machine learning (ML) models trained to map images of the one or more objects from the plurality of distances to respective turbidity values.

In a further implementation form of the first and/or second aspects, the one or more trained ML models are trained using a plurality of labeled training images depicting the one or more objects from a plurality of distances. A label of each of the plurality of labeled training images is indicative of a distance from which the respective training image is captured and a measured turbidity value.

In a further implementation form of the first and/or second aspects, the one or more objects are detected using one or more visual analysis algorithms applied to analyze the plurality of images.

In an optional implementation form of the first and/or second aspects, one or more of the plurality of images are converted to a plurality of respective greyscale images before calculating the luma value for each of the plurality of pixels.

In an optional implementation form of the first and/or second aspects, one or more of the plurality of images are preprocessed using one or more filters configured to enhance one or more of the plurality of images.

In a further implementation form of the first and/or second aspects, the distance to the one or more object is calculated using one or more distance measurement device.

In a further implementation form of the first and/or second aspects, the distance to the one or more objects is calculated based on one or more known dimensions of the one or more objects extracted from a respective image.

In a further implementation form of the first and/or second aspects, the one or more gradient lines are members of a group consisting of: a horizontal line, a vertical line, a diagonal line, and a curved line.

In a further implementation form of the first and/or second aspects, the gradient line selected for calculating the intensity change comprises a plurality of pixels with gradually increasing or gradually decreasing luma value.

In a further implementation form of the third and/or fourth aspects, each of the plurality of segments comprises a predefined number of pixels of the one or more images.

In a further implementation form of the third and/or fourth aspects, the turbidity of the water based is evaluated based on a peak of the histogram.

In a further implementation form of the third and/or fourth aspects, the turbidity of the water based is evaluated based on a Weibull distribution derived from the histogram.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of an exemplary process of evaluating water turbidity based on analysis of images of one or more objects submerged in the water, according to some embodiments of the present invention;

FIG. 3 illustrates exemplary image captures showing a certain object submerged in water having different turbidity levels;

FIG. 6 is a flowchart of a second exemplary process of evaluating water turbidity based on analysis of images depicting varying color under water patterns, according to some embodiments of the present invention.

DESCRIPTION OF SPECIFIC EMBODIMENTS OF THE INVENTION

Figure 2:
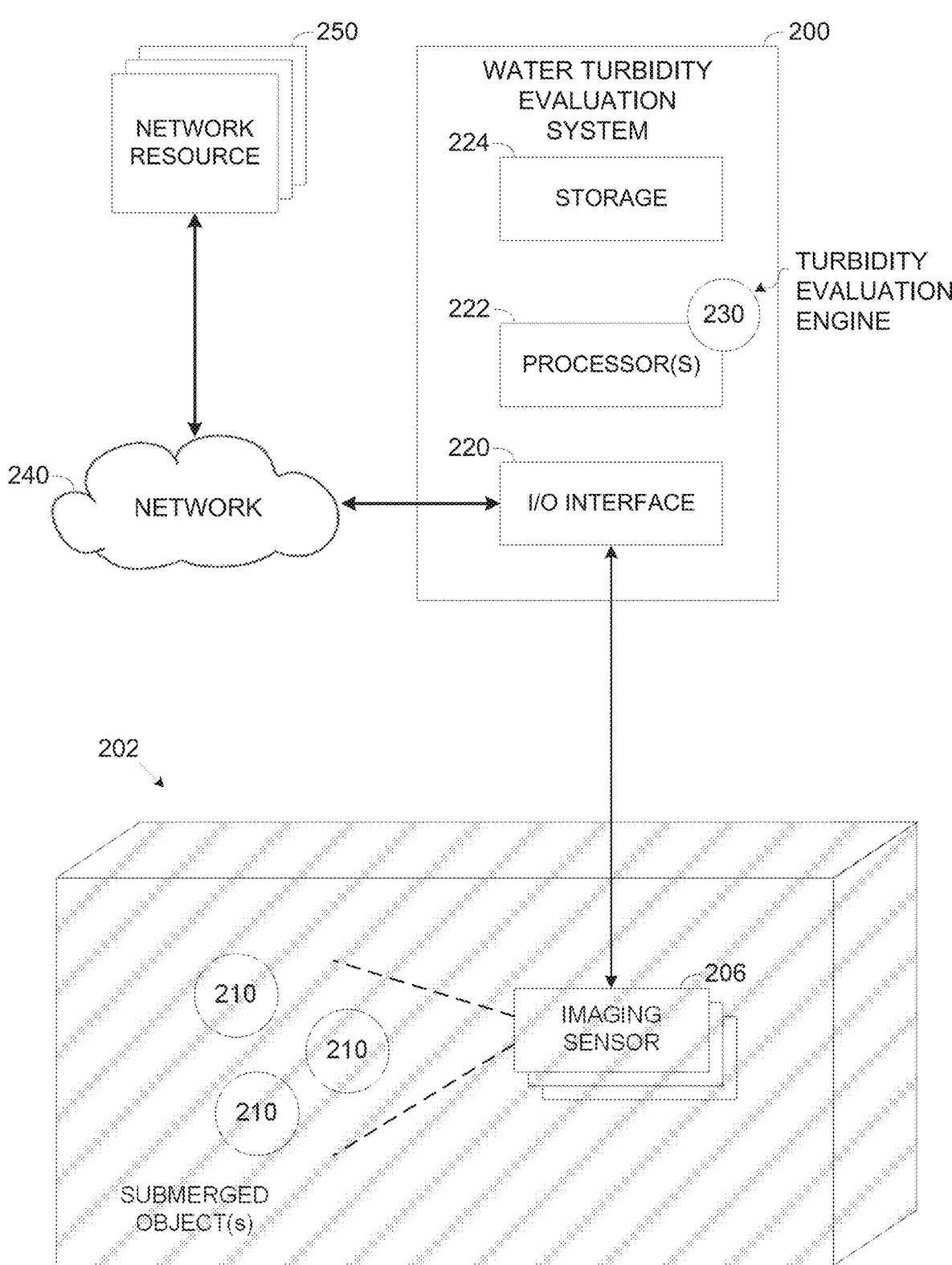
FIG. 2 is a schematic illustration of an exemplary system for evaluating water turbidity based on analysis of images of one or more objects submerged in the water, according to some embodiments of the present invention.

The present invention, in some embodiments thereof, relates to evaluating turbidity of water in water bodies, and, more specifically, but not exclusively, to evaluating (estimating) turbidity of water in water bodies based on visual analysis of images captured by image sensors.

According to some embodiments of the present invention, there are provided methods, systems and computer program products for evaluating (estimating) water turbidity based on visual analysis of images captured underwater, in particular, based on distribution of intensity (brightness, luminance) of pixels in the images depicting objects and/or patterns submerged in the water.

This visual analysis based water turbidly evaluation takes advantage of the fact that brightness changes (differences) in pixels portraying a submerged object may be highly indicative of the water turbidly, in particular, the larger the brightness change, the lower is the turbidity of the water, and vice versa, the smaller the brightness change, the higher is turbidity of the water. However, visual analysis may only apply for cases where there is a change in the brightness of the pixels portraying submerged object(s) and may be therefore significantly less efficient and possibly even impractical in case of no such brightness change, for example, due to excessive turbidity.

A plurality of images, for example, still images, video stream frames, and/or the like may be captured underwater by one or more imaging sensors (e.g., camera, video camera, Infrared camera, etc.) deployed in a body of water, in particular a manmade (artificial) body of water, for example, a swimming pool, a water reservoir, a fountain, and/or the like, collectively designated water pool herein after. The imaging sensor(s) may be statically deployed in the water pool (e.g. pool wall) and/or mounted on one or more pool water platforms, such as pool robot cleaner, skimmer, buoyed and/or the like which may dynamically move in the water pool.

In particular, the images captured in the water pool may depict one or more objects and/or patterns which are at least partially submerged in the water, for example, a lamp, a buoy, a pattern marked on a submerged surface (e.g. wall, floor, panel, board, etc.) and/or the like. While the objects may be fully submerged in the water and/or partially submerged, for brevity, such objects are designated submerged objects herein after.

Moreover, the plurality of images portraying the submerged object(s) may be captured for a plurality of distances from the submerged object(s), i.e., the images are captured by imaging sensor(s) located at a plurality of different distances from the submerged object(s).

The images may be analyzed and processed to identify one or more of the submerged object(s) and further to correlate between common object(s) in images depicting the submerged object(s) from at least some of the plurality of distances.

Optionally, one or more filters, for example, a noise filter and/or the like may be applied to one or more of the images to improve the images, for example, increase quality, sharpness, uniformity and/or the like. Moreover, one or more of the images may be converted to greyscale format in attempt to improve their brightness (luma) representation.

One or more images depicting the submerged object(s) from each of the distances may be analyzed to select one or more lines crossing the submerged object(s). Specifically, the line(s) selected in each image may be a gradient line comprising a plurality of pixels having gradually increasing or gradually decreasing brightness, i.e., gradually increasing or gradually decreasing luma values.

After calculating the luma value for each of the pixels along one or more gradient lines in each of one or more image(s) captured from each of the distances from the submerged object(s), a respective maximal brightness change may be calculated for each of the distances. The maximal brightness change calculated for the pixels along the gradient line(s) selected in the image(s) captured from each of the distances may express the different between the highest luma value and the lowest luma value of the pixels along the gradient line.

Turbidity of the water in the water pool, which may be expressed, for example, in terms of Nephelometric Turbidity Units (NTU), may be evaluated and/or estimated using one or more methods, techniques and/or algorithms based on mapping of the maximal brightness changes to their corresponding distances.

For example, one or more fitting functions may be applied to fit on a distribution of the maximal brightness changes with respect to their corresponding distances. Each fitting function may comprise one or more turbidity related parameters which may be searched, selected, altered and/or the like to optimize a fit of the fitting function on the distribution of the maximal brightness changes. The water turbidity may be thus calculated, derived, evaluated, estimated and/or otherwise determined based on the turbidity related parameter(s) yielding best (optimal) fit over the maximal brightness changes distribution.

In another example, the water turbidity may be evaluated using one or more Machine Learning (ML) models trained to estimate and/or predict a water turbidity based on the images of the submerged object(s) captured from the plurality of distances. The ML model(s) may be trained in one or more supervised training sessions using a plurality of labeled training images of the submerged object(s) where the label of each training image indicates the distance from the submerged object and a turbidity value indicating the actual turbidity level of the water in the water pool. Moreover, in order to improve their accuracy, robustness and/or reliability, the ML model(s) may be trained with images of the submerged object(s) captured in a plurality of different conditions (e.g., illumination, etc.), view angels and/or the like. In addition, the ML model(s) may be further trained online, post deployment.

According to some embodiments of the present invention, the water turbidity may be evaluated and/or estimated based on Standard Deviation (STD) of the intensity of pixels in images depicting one or more varying color patterns marked, formed, embedded and/or otherwise present on one or more surfaces of the water pool, for example, a circumferential wall, the floor, and/or part thereof.

One or more images depicting one or more varying color patterns identified underwater in a water pool may be each divided to a plurality of segments of equal size.

The luma value may be calculated for each of the pixels in each of the segments, or at least the segments portraying the varying color pattern, and a brightness STD may be computed for each of the segments based on the luma values of the pixels of the respective segment.

A histogram may be created based on an inverse value of the brightness STD values of the segments, i.e., based on 1/STD of each of the segments. Optionally, a plurality of histograms may be carpeted based on the brightness STD calculated for the segments of a plurality of images depicting the varying color pattern(s) and an aggregated histogram may be created by aggregating, for example, summing the histograms created for the plurality of images.

The turbidity of the water in the water pool may be then evaluated, estimated, calculated, derived and/or otherwise determined using one or more methods, functions and/or algorithms based on the histogram or optionally on the aggregated histogram if exists. For example, the water turbidity may be evaluated according to a peak of the histogram. In another example, the water turbidity may be evaluated according to one or more parameters of a Weibull distribution generated based on the histogram.

One or more actions may be initiated based on the evaluated water turbidity, specifically, in case the evaluated turbidity exceeds one or more threshold values and one or more actions should be taken to treat the water. For example, one or more alert message may be transmitted to one or more maintenance personnel and/or automated systems which may take one or more actions to treat the water in case of high turbidity, for example, circulate the water through one or more filtering systems, dispose one or more materials (e.g. chlorine) into the water, replace the water or part thereof and/or the like.

Evaluating and/or estimating the turbidity of water in a water pool based on visual analysis applied for calculate the brightens distribution of image pixels depicting submerged objects and/or patterns may present significant benefits and advantages compared to currently existing methods and system for measuring water turbidity.

First, most of the existing systems, devices and methods for measuring water turbidity are based on chemical test equipment used to evaluate the composition and/or content of the water. Such chemical test equipment may be significantly complex, expensive and typically highly inaccessible due to a plurality of limiting requirements. For example, such chemical test equipment may be significantly large in size and may require substantial space to deploy. Moreover, the technology used by such chemical test equipment may be highly complex, for example, sampling means, chemical analysis equipment and/or the like which may require specialized high cost hardware and/or extensive computing resource, for example, processing resources, storage resources and/or the like. Furthermore, the chemical test equipment may require high and/or expert maintenance.

In contrast, evaluating water turbidity based on visual analysis may require only very simple, low cost and highly accessible imaging devices thus significantly reducing cost, complexity, and/or maintenance of the evaluation system. In addition, the calculation of the intensity distribution across the submerged objects and/or patterns may be very simple thus significantly reducing the computing resources compared to the complex chemical measurement and composition analysis.

Moreover, since evaluating the water turbidity relies on simple low cost, small form factor and cheap imaging sensors, the water turbidity evaluation system and/or engine may be integrated in existing water platforms, for example, water treatment, cleaning and/or purifying systems and/or robots already deployed and used in a plurality of water pools, for example, public swimming pools, private swimming pools, water reservoirs, city fountains and/or the like. In fact, some of the existing water platforms may be already equipped with such imaging sensors which may be configured to capture to images used to evaluate the water turbidity. This availability of the imaging sensor(s) may further simplify deployment of the water turbidity evaluation system which may increase its adoption and use.

Furthermore, since water turbidity may be evaluated on premises at the water pool, rapid action may be taken to treat the water in case, based on the turbidity evaluation, it is determined that the water require treatment. The actions may be taken very quickly in response to the on premises turbidity evaluation compared to the prolonged time that may be required for the chemical test which may itself take significant time and may typically be conducted remotely.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of evaluating water turbidity based on analysis of images one or more objects submerged in the water, according to some embodiments of the present invention.

An exemplary process 100 may be executed to evaluate (estimate) water turbidity of the water in one or more bodies of water. Specifically, rather than applying any chemical tests and/or water content measurements, the water turbidity may be evaluated based on changes in brightness level of pixels in images of one or more objects submerged in the water along a gradient line crossing the object(s) in the images.

This visual analysis based water turbidly evaluation relies on the fact that brightness change (difference) along the gradient line is highly indicative of the water turbidly, in particular, the higher the brightness change, the lower is the turbidity of the water, and vice versa, the lower is the brightness change, the higher is turbidity of the water.

Reference is also made to FIG. 2, which is a schematic illustration of an exemplary system for evaluating water turbidity based on analysis of images of one or more objects submerged in the water, according to some embodiments of the present invention.

An exemplary water turbidly evaluation system 200 may be deployed to evaluate turbidity of water in one or more bodies of water 202, specifically manmade (artificial) bodies of water rather than natural bodies of water, for example, a pool, a swimming pool, a water reservoir, and/or the like designated water pool 202 herein after.

The water turbidly evaluation system 200 may receive imagery data, for example, an image, a video stream and/or the like from one or more imaging sensors 206, for example, a camera, a video camera, an Infrared (IR) sensor and/or the like deployed in the water pool 202.

The imaging sensor(s) 206 may be configured and/or operated to capture one or more images of one or more objects 210 which are at least partially submerged in the water, for example, a lamp, a buoy, a pattern marked (e.g.

painted, engraved, embedded, etc.) on a submerged surface (e.g. wall, floor, panel, board, etc.) and/or the like. While the object(s) 210 may be fully submerged in the water and/or partially submerged, for brevity, the object(s) 210 are designated submerged object(s) 210 herein after.

Moreover, the imaging sensor(s) 206 may be configured and/or operated to capture images of the submerged object(s) 210 from one or more distances, i.e., from different distances between the imaging sensor(s) 206 and the submerged object(s) 210.

For example, one or more mobile imaging sensors 206 may be operated to capture images of the submerged object(s) 210 from a plurality of different distances. For example, the mobile imaging sensor(s) 206 may be mounted on one or more automated vehicles, for example, an underwater robot, a pool cleaning robot, a camera carrying device, and/or the like which may move at least partially underwater in the water pool 202. The mobile imaging sensor(s) 206 may be therefore operated to capture one or more images of the submerged object(s) 210 from a plurality of different distances. In another example, the mobile imaging sensor(s) 206 may be mounted on one or more moving rails such that that the location of the mobile imaging sensor(s) 206 may change with respect to one or more submerged objects 210.

In another example, a plurality of imaging sensors 206 may be statically deployed in the water pool 202 at a plurality of different distances from the submerged object(s) 210. Moreover, one or more static imaging sensor(s) 206 may be configured to capture images of one or more dynamic submerged objects 210 which are moving at least partially underwater in the water pool 202, for example, an underwater robot, a moveable buoy and/or the like. Furthermore, one or more dynamic submerged objects 210 may be mounted on one or more moving rails such that that the location of the dynamic submerged object(s) 210 may change with respect to the imaging sensor(s) 206.

The water turbidly evaluation system 200, for example, a controller, a computer, a server, a computing node, a cluster of computing nodes and/or the like may include an Input/Output (I/O) interface 220, a processor(s) 222, and a storage 224 for storing data and/or computer program code (program store).

The I/O interface 220 may include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN, e.g. Wi-Fi), and/or the like. Via the I/O interface 220, the water turbidly evaluation system 200 may communicate with one or more external devices, in particular with the imaging sensor(s) 206.

The I/O interface 220 may further include one or more wired and/or wireless network interfaces for connecting to a network 240 comprising one or more wired and/or wireless networks, for example, a Local Area Network (LAN), a WLAN (e.g. Wi-Fi), a Wide Area Network (WAN), a Metropolitan Area Network (MAN), a cellular network, the internet and/or the like. Via the I/O interface 220, the water turbidly evaluation system 200 may communicate over the network 240 with one or more remote network resources 250, for example, a server, a storage server, a cloud service, and/or the like.

Moreover, in case one or more of the imaging sensor(s) 206 is connected to the network 240, the water turbidly evaluation system 200 may communicate with such imaging sensor(s) 206 via the network 240.

The processor(s) 222, homogenous or heterogeneous, may include one or more processing nodes arranged for parallel processing, as clusters and/or as one or more multi core processor(s).

The storage 224 may include one or more non-transitory memory devices, either persistent non-volatile devices, for example, a ROM, a Flash array, a hard drive, an SSD, and/or the like as well as one or more volatile devices, for example, a RAM device, a cache memory and/or the like. The storage 224 may further comprise one or more local and/or remote network storage resources, for example, a storage server, a Network Attached Storage (NAS), a network drive, a cloud storage service and/or the like accessible via the network 240.

The processor(s) 222 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 224 and executed by one or more processors such as the processor(s) 222.

Optionally, the processor(s) 222 may include, utilize and/or apply one or more hardware elements available in the water turbidly evaluation system 200, for example, a circuit, a component, an Integrated Circuit (IC), an ASIC, an FPGA, a Digital Signals Processor (DSP), a Graphic Processing Unit (GPU), an Artificial Intelligence (AI) accelerator, and/or the like.

The processor(s) 222 may therefore execute one or more functional modules utilized by one or more software modules, one or more of the hardware modules and/or a combination thereof. For example, the processor(s) 222 may execute a turbidity evaluation engine 230 configured to execute the process 100.

Optionally, the water turbidly evaluation system 200, specifically, the turbidity evaluation engine 230 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

In some embodiments, the water turbidly evaluation system 200 may be integrated in one or more water cleaning systems and/or equipment, for example, a cleaning system, a purifying system, and/or the like configured to automatically clean the water in the water pool 202. In such embodiments, the water cleaning system may execute the turbidity evaluation engine 230 for executing the process 100.

Reference is now made to FIG. 3, which illustrates exemplary image captures showing a certain object submerged in water having different turbidity levels.

As seen in image capture 300, an exemplary submerged object 210A such as the submerged object 210, for example, a lamp fixed in a circumferential wall of a water pool such as the water pool 202, for example, a swimming pool, may be highly visible when the water in the pool are clean and the turbidity level of the water is low. However, when the water turbidity is high, as seen in image capture 302, the submerged object 210A portrayed from the same distance as in image capture 300 is highly invisible and even its outline can be hardly identified.

Reference is made once again to FIG. 1.

For brevity, the process 100 is presented and described for evaluating water turbidity in a single water pool 202 based on visual analysis for calculating brightness change along one or more gradient lines across a single submerged object 210. This, however, should not be construed as limiting since the process 100 may be easily expanded for evaluating water turbidity in a plurality of water pools 202. Moreover, as may become obvious to a person skilled in the art, the process 100 may be conducted and/or enhanced by calculating the brightness change (difference) along gradient lines across a plurality of submerged objects 210.

As shown at 102, the process 100 starts with the turbidity evaluation engine 230 receiving a plurality of images, for example, still images, video stream, and/or the like depicting an object 210 submerged, at least partially, in a water pool 202, for example, a lamp, a buoy, a pattern painted on a submerged surface (e.g. wall, floor, panel, board, etc.) and/or the like.

In particular, the received images captured under water by one or more imaging sensors 206 may depict the submerged object 210 from a plurality of different distances. This means that the imaging sensor(s) 206 are located at different distances from the submerged object 210 when capturing the images of the submerged object 210.

The distances from which the submerged object 210 is captured in the images may be, for example, in a range of 0.5 meters to 2 meters with 0.1 meter steps, i.e., 0.5 meters, 0.6 meters, 0.7 meters and so on to 2 meters. In another example, the distances may be, for example, in a range of 1 meter to 10 meters with 0.5 meter steps.

The distances may be optionally adjusted, defined and/or set according to one or more visibility conditions and/or parameters relating to the water pool 202, which may relate to water pool 202, the water in the water pool 202, the submerged object 210, environment illumination and/or the like. For example, in case the water pool 202 is relatively small, the distances may be reduced (shortened) while in larger water pools 202 the distances may be increased. In another example, in case the submerged object 210 is small, the distances may be reduced while for larger submerged objects 210 the distances may be increased. In another example, assuming the illumination in the water pool 202 is low such that visibility of the submerged objects 210 is relatively poor, the distances may be reduced. In contrast, in case illumination in the water pool 202 is high and the submerged objects 210 is highly visible, the distances may be increased.

Moreover, the distances may be optionally adjusted according to one or more of the visibility conditions and/or parameters relating to the water pool 202. For example, assuming turbidity of the water in the water pool 202 is high such that the submerged object 210 may not be clearly visible from long distances, the range of distances from which the images of the submerged object 210 are captured may be reduced.

Optionally, one or more of the received images may be received with associated distance information indicative of the distance between the imaging sensor(s) 206 capturing the respective image and the submerged object 210.

The distance information may be captured using one or more distance measurement devices as known in the art, for example, laser based, Radio Detection and Ranging (RADAR) based, Sound Navigation and Ranging (SONAR) based, and/or the like. One or more such distance measurement devices may be associated with the imaging sensor(s) 206 and configured to measure distance to the submerged object 210.

In another example, the distance information may be predefined. For example, assuming one or more of the images are captured by one or more static imaging sensors 206 deployed and located at a plurality of known distances from the submerged object 210 which may be also static. In such case, each image captured by one of the static imaging sensor(s) 206 may be therefore coupled with distance information indicating the distance between the respective static imaging sensor 206 and the submerged object 210. Additionally, and/or alternatively, the distance information may indicate an identifier (ID) of the respective static imaging sensor 206 which may be used to access one or more records (e.g., list, table, database, etc.) associating one or more of the static imaging sensor(s) 206 with a distance between the respective static imaging sensor 206 and the submerged object 210.

As shown at 104, the turbidity evaluation engine 230 may analyze the images to identify the submerged object 210 in each of the images.

The turbidity evaluation engine 230 may employ one or more visual analysis methods, tools, and/or algorithms as known in the art to analyze the images and identify the submerged object 210, for example, image processing, computer vision, ML based detection and/or classification, and/or the like.

Moreover, the turbidity evaluation engine 230 may apply one or more techniques to correlate the submerged object 210 in the images captured from the plurality of distances, to verify that the same submerged object 210 is identified and used (targeted) in all images. For example, the turbidity evaluation engine 230 may identify one or more visual features of the submerged object 210, for example, an outline, a shape, a pattern, a texture, a color, and/or the like to track the same submerged object 210 in the different images. In another example, the turbidity evaluation engine 230 may determine that the same submerged object 210 is identified in all images based on a reference, for example, position, location, distance and/or the like compared to one or more reference objects, for example, an object (e.g. drain opening, pillar, etc.) located in the water pool 202, a pattern marked on a wall/floor of the water pool 202, a buoy floating in the water pool 202, and/or the like.

Optionally, one or more of the images depicting the submerged object 210 may be converted to greyscale using one or more methods known in the art in order to improve visibility of the submerged object 210 and/or part thereof. The conversion to greyscale may be done by the turbidity evaluation engine 230 at the water turbidly evaluation system 200. However, the greyscale conversion may be done remotely by one or more other devices, systems, services, for example, a remote network resource 250, such as, for example, a remote server, a cloud service, etc.), and/or the like accessible to the turbidity evaluation engine 230 via the network 240. In another example, the may be done by one or more other functional modules (software and/or hardware) executed by the water turbidly evaluation system 200.

Optionally, one or more filters may be applied to one or more of the images depicting the submerged object 210 to improve visibility of the submerged object 210 and/or part thereof. For example, a noise reduction filter as known in the art may be applied to one or more of the images to improve the representation (image) of the submerged object 210 and/or part thereof in the respective image(s). As described herein before for the greyscale conversion, the filter(s) may be applied by the turbidity evaluation engine 230, another functional module(s) executed by the water turbidly evaluation system 200 and/or remotely by one or more remote network resources 250.

Figure 4:
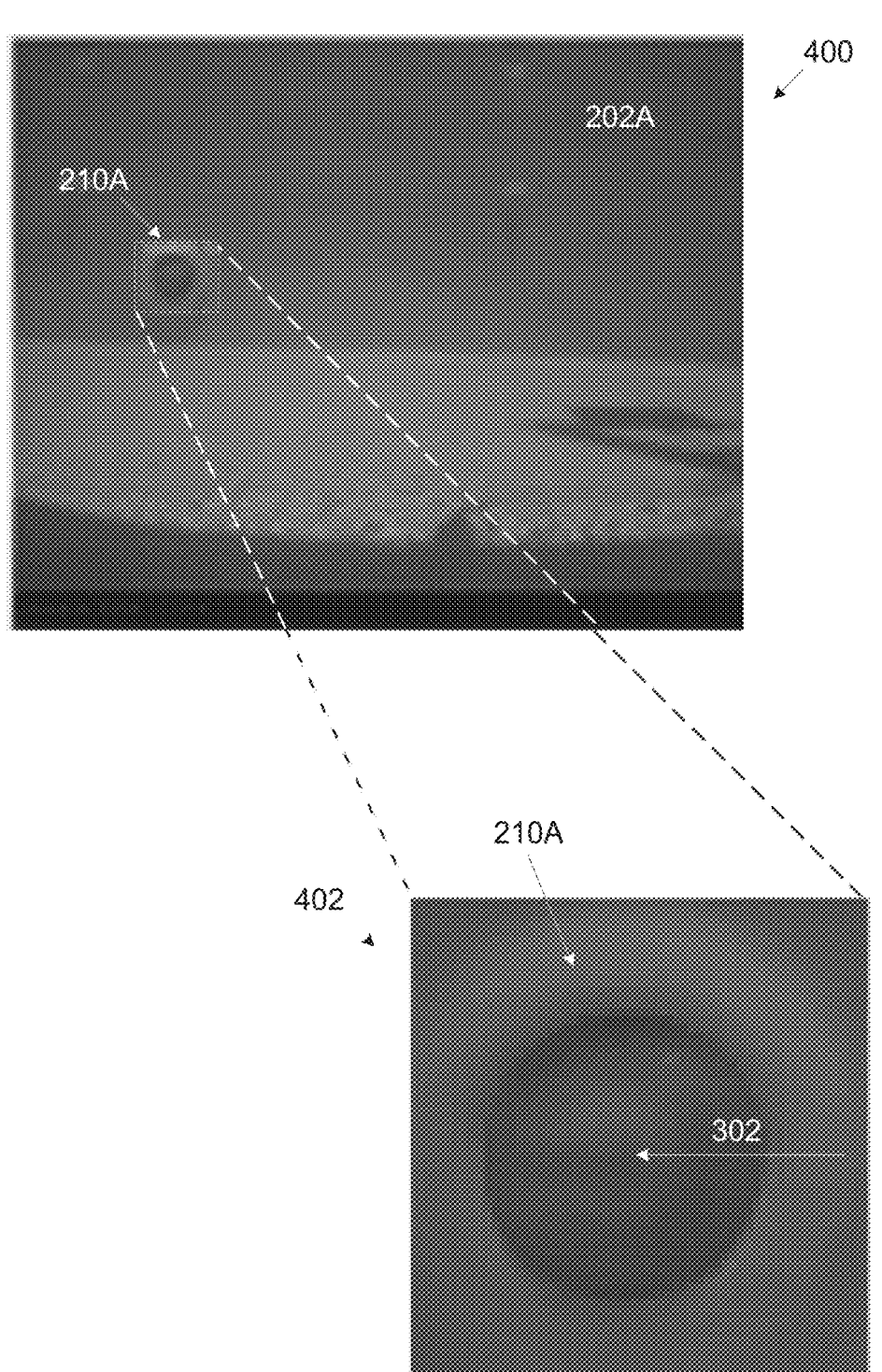
FIG. 4 is an exemplary image capture of an object submerged in water used for evaluating the water turbidity, according to some embodiments of the present invention.

Reference is now made to FIG. 4, which is an exemplary image capture of an object submerged in water used for evaluating the water turbidity, according to some embodiments of the present invention.

An image capture 400 may be captured underwater in water pool such as the water pool 202, for example, a swimming pool 202A.

A turbidity evaluation engine such as the turbidity evaluation engine 230 executed by a system such as the water turbidly evaluation system 200 may apply one or more image processing algorithms, as describe herein before, to process the image 400 in order to identify one or more submerged objects such as the submerged object 210, for example, a submerged lamp 210A installed in a circumferential wall of the swimming pool 202A.

Moreover, the turbidity evaluation engine 230 may extract a section of the image capture 400, for example, an image section 410 depicting the submerged lamp 210A such that the turbidity evaluation engine 230 may process only the image portion containing the submerged lamp 210A rather than the entire image 400 thus reducing computing resources, for example, processing resources, storage resources, time and/or the like.

Reference is made once again to FIG. 1.

As shown at 106, the turbidity evaluation engine 230 may compute, estimate, derive and/or otherwise determine the distance to the submerged object 210 in each of the images, i.e., the distance between the submerged object 210 and the imaging sensor 206 which captured the respective image.

The turbidity evaluation engine 230 may apply one or more methods to determine the distance to the submerged object 210. For example, in case one or more of the received images is associated with the distance information, the turbidity evaluation engine 230 may analyze the received distance information to extract the distance between the imaging sensor 206 which captured the respective image and the submerged object 210.

Optionally, the turbidity evaluation engine 230 may calculate and/or derive the distance to the submerged object 210 in one of more of the images based on actual (real-world) values one or more known dimensions of the submerged object 210, for example, a width, a length, a height, a diameter, a length of one or more features of the submerged object 210 (e.g., base, frame, etc.), and/or the like which may be expressed in one or more distance units, for example, meters, centimeters, inches, and/or the like.

The turbidity evaluation engine 230 may calculate a value of the known dimension extracted from the respective image. For example, as known in the art, based on a known resolution of the respective image, the turbidity evaluation engine 230 may calculate a value of the known dimension extracted from the respective image in distance unit(s) based on the number of pixels measured for the known dimension in the respective image.

The turbidity evaluation engine 230 may then calculate the distance to the submerged object 210 in the respective image based on a ratio between the known dimension measured in the respective image and the actual value of the known dimension.

As shown at 108, the turbidity evaluation engine 230 may calculate a luma value for each of a plurality of pixels along one or more gradient lines across (crossing) the submerged object 210 in each of the images captured from the plurality of distances from the submerged object 210.

Each gradient line across the submerged object 210 may comprise a plurality of pixels having a gradually increasing or a gradually decreasing luma (brightness, intensity) values.

For example, each pixel along the gradient line may have a higher luma value (brighter) compared to its preceding pixels. Complementary, moving in the other direction along the gradient line, each pixel along the gradient line may have a lower luma value (darker) compared to its preceding pixels.

The gradient lines may cross the submerged object 210 and/or part thereof in plurality of directions and/or patterns, for example, a horizontal line, a vertical line, a diagonal line, a curved line, and/or the like.

For example, as seen in the image section 410 of FIG. 4, the turbidity evaluation engine 230 may select one or more lines across the lamp 210A, in particular gradient lines comprising a plurality of pixels having gradually increasing or gradually decreasing luma values. For example, the turbidity evaluation engine 230 may select an exemplary gradient line 302 comprising a plurality of pixels having gradually decreasing luma values, i.e., the first pixels in the gradient line 302 are relatively bright (high luma) and the succeeding pixels along the gradient line 302 are gradually darker (lower luma).

For brevity, the turbidity evaluation engine 230 is described herein after to evaluate the water turbidity in the water pool 202 based on analysis of a single gradient line across the submerged object 210. This however, should not be construed as limiting, since the turbidity evaluation engine 230 may select a plurality of gradient lines across the submerged object 210 to evaluate and/or improve evaluation of the water turbidity in the water pool 202.

The turbidity evaluation engine 230 may calculate the luma value of each of the pixels along the gradient line using one or more methods as known in the art. For example, each pixel in each of the images may be associated with a luma value and a chroma value. In such case, the turbidity evaluation engine 230 may extract the luma value of each pixel. In another example, each pixel in each of the images may be associated with color information, for example, RGB values. In such case, the turbidity evaluation engine 230 may apply one or more conversion functions and/or formulations as known in the art to calculate the luma value based on the RGB values.

As shown at 110, the turbidity evaluation engine 230 may calculate a respective maximal intensity change (difference) between a lowest luma value and highest luma value of the pixels along the at selected gradient line across the submerged object 210.

The maximal intensity change calculated for each gradient line in each image may be expressed by a difference between the lowest luma value identified for any of the pixels along the respective gradient line and the highest luma value identified for any of the pixels along the respective gradient line.

The turbidity evaluation engine 230 may therefore produce a plurality of maximal intensity changes, each corresponding to a respective one of the distances from the at least partially submerged object 210 from which the respective image was captured.

As shown at 112, the turbidity evaluation engine 230 may evaluate turbidity of the water in the water pool 202, for example, in terms of NTU, based on mapping of each respective maximal intensity change computed in each of the images to each of the plurality of distances.

To this end, the turbidity evaluation engine 230 may map each maximal intensity change to a respective one of the plurality of distances from the submerged object 210 which, as described herein before, is the distance between the submerged object 210 and the imaging sensor 206 at the time of capturing the respective image for which the respective maximal intensity change is computed.

For example, the turbidity evaluation engine 230 may evaluate the turbidity of the water based on one or more fitting functions adapted to approximate a distribution of the plurality of maximal intensity changes mapped with respect to the plurality of respective distances from the submerged object 210. One exemplary such fitting function is formulated in equation 1 below.

$$y = a \cdot e^{-b \cdot x}$$ 
Equation 1:

Where y is the respective maximal intensity change calculated for each of the plurality of images and thus corresponds to one of the plurality of distances x, a is a largest maximal intensity change identified among all of the plurality of maximal intensity changes calculated for all gradient lines in all of the images, and b is the estimated turbidity in terms of NTU.

The turbidity evaluation engine 230 may therefore calculate the turbidity of the water in the water pool 202 according to an optimal fit (approximation) of the fitting function to the distribution of the plurality of maximal intensity changes mapped to the plurality of respective distances. For example, for the fitting function of equation 1, since y, x, and a may be known and/or computed, the turbidity evaluation engine 230 may adapt, adjust and/or manipulate the estimated turbidity b to find a turbidity value b which yields an optimal fit (approximation) of the fitting function to the distribution of the maximal intensity changes mapped to their respective distances.

Figure 5:
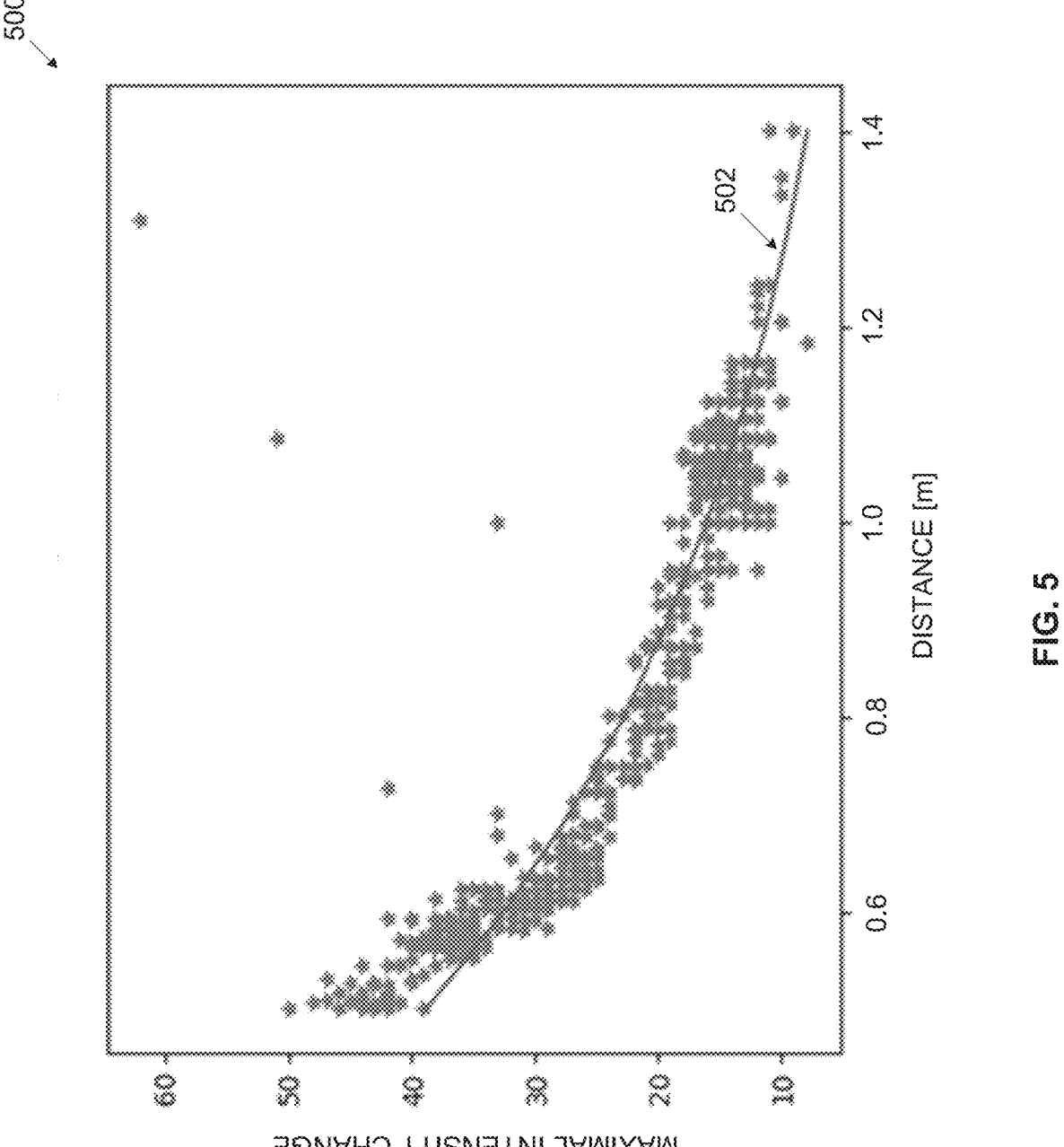
FIG. 5 is a graph chart illustrating an exemplary fitting function applied for evaluating water turbidity which maps distribution of brightness changes between pixels of images along a gradient crossing an object to distances from which the images are captured, according to some embodiments of the present invention.

Reference is now made to FIG. 5, which is a graph chart illustrating an exemplary fitting function applied for evaluating water turbidity which maps distribution of brightness changes between pixels of images along a gradient crossing an object to distances from which the images are captured, according to some embodiments of the present invention.

As seen in graph chart 500, an exemplary distribution of plurality of maximal intensity changes may be mapped to a plurality of respective distances (measured in meters). Each dot in the graph chart represents a maximal intensity change calculated for a gradient line across a submerged object such as the submerged object 210 in an image captured from a certain distance from submerged object 210.

A turbidity evaluation engine such as the turbidity evaluation engine 230 may attempt to adapt, optimize and/or otherwise manipulate one or roe one or more fitting functions to optimally fit. i.e., follow and/or represent the distribution. For example, assuming the turbidity evaluation engine 230 applies the fitting function of equation 1, illustrated by the graph line 502, the turbidity evaluation engine 230 may search for a turbidity NTU value, b, for which the fitting function best fits the distribution.

For the illustrated exemplary distribution, the water turbidity b, evaluated by the turbidity evaluation engine 230 is 0.46 which may be indicative of low turbidity meaning that the water in water pool 202 are significantly clean.

Reference is made once again to FIG. 1.

In another example, the turbidity evaluation engine 230 may evaluate the turbidity of the water using one or more trained ML models trained to map images of the submerged object 210 to respective water turbidity values, for example, NTU. In particular, the ML model(s) may be trained to estimate and/or predict the water turbidity based on analysis of the images and according to the distance to the submerged object 210 in each of the images.

The ML model(s) may be trained in one or more supervised training sessions using a plurality of labeled training images of the submerged object 210. Each of the training images may associate the respective training image with a distance from the submerged object 210 and a measured turbidity value indicating the actual turbidity level of the water in the water pool 202 at the time of capturing the respective training image. The measured turbidity value may be measured, computed and/or otherwise determined using one or more methods known in the art, for example, a chemical analysis, measurement of water composition, and/or the like.

Naturally, the ML model(s) may be trained with images of the submerged object 210 which is used by the turbidity evaluation engine 230 to evaluate the water turbidity in the water pool 202. Therefore, in case there are a plurality of such submerged objects 210 which may be used by the turbidity evaluation engine 230 to evaluate the water turbidity, the ML model(s) may be trained with labeled training images depicting the plurality of submerged objects 210.

Moreover, in order to improve their accuracy, robustness and/or reliability, the labeled training images used to train the ML model(s) may comprise images of the submerged object 210 captured in a plurality of different conditions, view angels and/or the like. For example, the training images of the submerged object 210 may comprise images depicting the submerged object 210 from a plurality of different angles. In another example, the training images of the submerged object 210 may comprise images captured in a plurality of different illumination conditions, for example, typical light, excessive light (bright), low light (dark), natural light, artificial light and/or the like.

Furthermore, the ML model(s) may be further trained online, post deployment, using images of the submerged object 210 captured in the water pool 202 and labeled with respective turbidity values. The online training may significantly improve adaptation and learning of the ML model(s) to the specific water pool 202 which the water turbidity evaluation system 200 is deployed to monitor and evaluate its water turbidity.

Using the trained ML model(s), the turbidity evaluation engine 230 may therefore evaluate the turbidity of the water in the water pool 202, for example, in terms of NTU.

As shown at 114, the turbidity evaluation engine 230 may initiate one or more actions according to the evaluated (estimated) turbidity of the water in the water pool 202. In particular, the turbidity evaluation engine 230 may initiate one or more actions in case the water turbidity exceeds a certain threshold and actin may be required to treat the water in the water pool 202 in order to reduce the water turbidity and improve clarity, purity and/or quality of the water.

The threshold used by the turbidity evaluation engine 230 to determine whether turbidity of the water in the water pool 202 is acceptable or not may be a predefined threshold. Moreover, the threshold may be predefined according to one or more attributes and/or parameters of the water pool 202. For example, in case the water pool 202 is a swimming pool, the threshold may be predefined to a relatively low value such that the turbidity of the water in the swimming pool is maintained at low level to ensure high visibility in the swimming pool and/or prevent health risks. However, in case the water pool 202 is a decorative reservoir, for example, a fountain, the threshold may be predefined to a higher low value since the turbidity of the water in the fountain may be slightly more turbid as no people enter it.

The threshold, however, may be dynamic adjusted and/or learned over time. For example, assuming that, based on a certain threshold value, the turbidity evaluation engine 230 determines the water in the water pool 202 are highly turbid while a visual inspection of the water pool 202 reveals that the water is actually significantly clear. In such case, the threshold may be adjusted, specifically increased thus reducing sensitivity of the turbidity evaluation engine 230 which may determine that the water in the water pool 202 is actually turbid at higher levels of turbidity. In another example, assuming the water in a certain water pool 202 typically become turbid very fast, the threshold may be adjusted, specifically reduced in order for the turbidity evaluation engine 230 to detect such turbidity conditions as soon as possible so that measures may be taken to clean the water.

The actions initiated by the turbidity evaluation engine 230 may include informative actions and/or proactive cleaning procedures employed to treat the water in the water pool 202.

For example, in case the evaluated turbidity of the water exceeds the threshold, the turbidity evaluation engine 230 may transmit one or more alert messages. The alert messages may be transmitted for example, to one or more maintenance and/or control personnel, service and/or the like who may evaluate the turbidity of the water in the water pool 202, optionally combined with one or more other conditions of the water pool 202 and take action accordingly if needed.

In another example, case the water turbidity exceeds the threshold, the turbidity evaluation engine 230 may induce operation of one or more water cleaning equipment, for example, a cleaning system, a pool cleaning robot, a purification systems and/or the like. For example, assuming the water pool 202 is a swimming pool, the turbidity evaluation engine 230 may communicate with water cleaning equipment, for example, a pool cleaning robot deployed to clean the swimming pool. In such case, the turbidity evaluation engine 230 may transmit an activation command to the pool cleaning robot which, in response, may start cleaning the swimming pool. In another example, the turbidity evaluation engine 230 may transmit the evaluated water turbidity to one or more purification systems of the swimming pool which may release and/or dispose one or more materials, substances, minerals and/or the like, for example, chlorine and/or the like to clean the water in the swimming pool.

In another example, assuming the water turbidity evaluation system 200 is integrated with water cleaning equipment, for example, a purification system of the water pool such that the turbidity evaluation engine 230 is executed by the purification system, in such case the turbidity evaluation engine 230 may operate the purification system directly to initiate one or more actions to clean the water in the water pool 202, for example, circulate the water through one or more filtering systems and/or devices, release chlorine to the water, replace the water or part thereof, and/or the like.

According to some embodiments of the present invention, the turbidity may apply an intensity STD analysis to evaluate the turbidity of the water in a water pool such as the water pool 202, in particular, based on STD of intensity of pixels depicting one or more varying color patterns marked and/or formed on one or more surfaces of the water pool 202, for example, a circumferential wall, the floor, and/or part thereof.

Reference is now made to FIG. 6, which is a flowchart of a second exemplary process of evaluating water turbidity based on analysis of images depicting varying color under water patterns, according to some embodiments of the present invention.

An exemplary process may be executed by a turbidity evaluation engine such as the turbidity evaluation engine

230 executed by a turbidity evaluation system such as the turbidity evaluation system 200 to evaluate the turbidity of the water in a water pool such as the water pool 202 based on STD of the intensity of pixels in one or more images captured underwater in water pool such as the water pool 202.

As shown at 602, the process 600 starts with the turbidity evaluation engine 230 receiving one or more images, for example, an image, a frame of a video stream and/or the like captured underwater by one or more imaging sensors such as the imaging sensors 206 deployed in the water pool 202.

Specifically, the image(s) may depict one or more varying color patterns marked, embedded and/or formed on one or more surfaces of the water pool 202, for example, a circumferential wall, the floor, and/or part thereof.

For brevity, evaluating the turbidity of the water in the water pool 202 according to the process 600 is based on analysis of a single image of a single varying color pattern. This however, should not be construed as limiting since the process 600 may be extended and/or repeated to evaluate and/or enhance evaluation of the water turbidity in the water pool 202 based on analysis of a plurality of images of the varying color pattern and/or based on analysis of a plurality of images of a plurality of varying color patterns marked, embedded and/or formed on one or more of the surfaces of the water pool 202.

The varying color pattern on the surface which may portray practically any pattern other than solid filling of the surface may be marked in a combination of a plurality of colors shades which are distinguishable from each other, for example, black and white, blue and white, yellow and green and/or the like.

The varying color pattern may be placed, formed and/or set on the surface of the water pool 202 in one or more manners and/or methods. For example, the varying color pattern may be marked on the surface, for example, painted, engraved and/or the like on the surface(s) of the water pool 202. In another example, the varying color pattern may be part of a texture of the surface formed by the built and/or coating of the surface, for example, a pattern formed by bricks of different color, a mosaic, and/or the like.

As shown at 604, the turbidity evaluation engine 230 may divide the received image to a plurality of segments of equal size. The size of the segments should be relatively small such that multiple segments may depict different parts of the varying color pattern.

The number of segments and/or the size of the segments may be therefore predefined, defined and/or set according to one or more parameters of the received image and/or the varying color pattern portrayed in the image. For example, assuming the image size is 640×480 pixels, the turbidity evaluation engine 230 may divide the image to segments of 32×24 pixels each. In another example, assuming the varying color pattern is portrayed in only half of the image with a size of 640×480 pixels, the turbidity evaluation engine 230 may use only the relevant half of the image and divide it to segments of 16×12 pixels.

As shown at 606, the turbidity evaluation engine 230 may calculate a luma value for each of the pixels of each of the segments of the image. The turbidity evaluation engine 230 may calculate the luma value of each pixel as described herein before in step 108 of the process 100.

As shown at 608, the turbidity evaluation engine 230 may calculate an STD, as known in the art, for each of the segments based on the luma values of the plurality of pixels of the respective segment.

As shown at 610, the turbidity evaluation engine 230 may generate a histogram for inverse values of the intensity $$STD\left(\frac{1}{STD}\right)$$

of the plurality of segments.

Optionally, in case a plurality of underwater images of the varying color pattern are received, the turbidity evaluation engine 230 may divide each of the images to segments and generate a plurality of histograms each for the $$\frac{1}{STD}$$

of the plurality of segments of each of the images. In such case, the turbidity evaluation engine 230 may aggregate the plurality of histograms, for example, sum the histograms to create an aggregated histogram for the $$\frac{1}{STD}$$

of the segments of all received images.

As shown at 612, the turbidity evaluation engine 230 may evaluate turbidity of the water in the water pool 202 based on the histogram of the $$\frac{1}{STD}$$

of the plurality of segments of the image or optionally based on the aggregated histogram if created for the plurality of images of the varying color pattern.

The turbidity evaluation engine 230 may apply one or more methods, techniques and/or algorithms to calculate, derive and/or estimate the water turbidity based on the $$\frac{1}{STD}$$

histogram.

For example, the turbidity evaluation engine 230 may estimate the water turbidity based on a peak of the $$\frac{1}{STD}$$

histogram and/or of the $$\frac{1}{STD}$$

aggregated histogram if created. In such case, the turbidity evaluation engine 230 may estimate the water turbidity based on one or more predefined and/or dynamically adjusted values and/or thresholds defined for histogram peak. For example, in case the value of the peak of the histogram is higher than a certain value, for example, 20, the turbidity evaluation engine 230 may determine that water turbidity is significantly high.

In another example, the turbidity evaluation engine 230 may estimate the water turbidity based on a Weibull distribution generated based on the $$\frac{1}{STD}$$

histogram and/or the $$\frac{1}{STD}$$

aggregated histogram if created. In such case, the turbidity evaluation engine 230 may estimate the water turbidity based on one or more predefined and/or dynamically adjusted values and/or thresholds defined for one or more parameters of the Weibull distribution, for example, a shape parameter (k), and/or a scale parameter ($\lambda$). For example, in case the value of the shape parameter is higher than a certain value, for example, 1.05 (k>1.05), the turbidity evaluation engine 230 may determine that water turbidity is significantly low.

As shown at 614, the turbidity evaluation engine 230 may initiate one or more actions according to the evaluated (estimated) turbidity of the water in the water pool 202 as described in step 114 of the process 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms image sensor, and ML model are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of estimating water turbidity using image data, comprising:

using at least one processor for:

analyzing a plurality of images captured under water by at least one imaging sensor to identify at least one object submerged at least partially in the water and distinguishable from its background, each of the plurality of images is captured from a respective one of a plurality of distances between the at least one imaging sensor and the at least one object;

calculating a luma value for each of a plurality of pixels along at least one gradient line across the at least one object in each of the plurality of images;

calculating, for each image, a respective maximal intensity change between a lowest luma value and a highest luma value of the pixels along the at least one gradient line in the respective image;

evaluating a turbidity of the water based on mapping of the respective maximal intensity change to each of the plurality of distances; and initiating at least one action in case the turbidity exceeds a certain threshold.

2. The method of claim 1, wherein turbidity of the water is evaluated based on at least one fitting function adapted to approximate distribution of the maximal intensity changes mapped with respect to the distances from the at least one object.

3. The method of claim 2, wherein the at least one fitting function is formulated by:

$$y = a \cdot e^{-b \cdot x}$$

where y is the respective maximal intensity change calculated for each of the plurality of images which correspond thus corresponding to one of the plurality of distances x, a is a largest maximal intensity change identified in the at least one gradient line in all of the images, and b is the estimated turbidity.

4. The method of claim 1, wherein turbidity of the water is evaluated using at least one machine learning (ML) model trained to map images of the at least one object from the plurality of distances to respective turbidity values.

5. The method of claim 4, wherein the at least one trained ML model is trained using a plurality of labeled training images depicting the at least one object from a plurality of distances, a label of each of the plurality of labeled training images is indicative of a distance from which the respective training image is captured and a measured turbidity value.

6. The method of claim 1, wherein the water is swimming pool water.

7. The method of claim 1, wherein the at least one action is a member of a group consisting of: transmitting at least one alert message, and inducing operation of water cleaning equipment in case the turbidity exceeds a predefined threshold.

8. The method of claim 1, wherein the at least one object is detected using at least one visual analysis algorithm applied to analyze the plurality of images.

9. The method of claim 1, further comprising converting at least one of the plurality of images to a plurality of respective greyscale images before calculating the luma value for each of the plurality of pixels.

10. The method of claim 1, further comprising preprocessing at least one of the plurality of images using at least one filter configured to enhance at least one of the plurality of images.

11. The method of claim 1, wherein the distance to the at least one object is calculated using at least one distance measurement device.

12. The method of claim 1, wherein the distance to the at least one object is calculated based on at least one known dimension of the at least one object extracted from a respective image.

13. The method of claim 1, wherein the at least one gradient line is a member of a group consisting of: a horizontal line, a vertical line, a diagonal line, and a curved line.

14. The method of claim 1, wherein the gradient line selected for calculating the intensity change comprises a plurality of pixels with gradually increasing or gradually decreasing luma value.

15. A system for evaluating water turbidity using image data, comprising:

at least one processor configured to execute a code, the code comprising:

code instructions to analyze a plurality of images captured under water by at least one imaging sensor to identify at least one object submerged at least partially in the water and distinguishable from its background, each of the plurality of images is captured from a respective one of a plurality of distances between the at least one imaging sensor and the at least one object;

code instructions to calculate a luma value for each of a plurality of pixels along at least one gradient line across the at least one object in each of the plurality of images;

code instructions to calculate, for each image, a respective maximal intensity change between a lowest luma value and a highest luma value of the pixels along the at least one gradient line in the respective image;

code instructions to evaluate a turbidity of the water based on mapping of the respective maximal intensity change to each of the plurality of distances; and code instructions to initiate at least one action in case the turbidity exceeds a certain threshold.

\* \* \* \* \*